(12) United States Patent
Huang

(10) Patent No.: US 7,584,977 B2
(45) Date of Patent: Sep. 8, 2009

(54) VEHICLE FRAME ASSEMBLY WITH COUPLING DEVICE FOR COUPLING TWO FRAME MEMBERS

(75) Inventor: Toshi Huang, Taichung Hsien (TW)

(73) Assignee: Gomier Manufacturing Co., Ltd., Ta-Chia Chen (TW)

( * ) Notice: Subject to any disclaimer, the term of this patent is extended or adjusted under 35 U.S.C. 154(b) by 589 days.

(21) Appl. No.: 11/382,952

(22) Filed: May 12, 2006

(65) Prior Publication Data

US 2007/0222173 A1    Sep. 27, 2007

(51) Int. Cl.
*B62K 3/02* (2006.01)
*B62K 19/00* (2006.01)
*B62K 21/00* (2006.01)

(52) U.S. Cl. .................. 280/278; 280/276; 280/287

(58) Field of Classification Search .............. 280/47.36, 280/87.041, 274, 276, 278, 279, 281.1, 282, 280/287

See application file for complete search history.

(56) References Cited

U.S. PATENT DOCUMENTS

| | | | | |
|---|---|---|---|---|
| 4,452,327 A | * | 6/1984 | Mowat et al. | 180/11 |
| 4,540,189 A | * | 9/1985 | Tanaka | 280/270 |
| 4,824,131 A | * | 4/1989 | Thay | 280/278 |
| 5,052,706 A | * | 10/1991 | Tsai et al. | 280/287 |
| 5,069,468 A | * | 12/1991 | Tsai et al. | 280/278 |
| 5,509,678 A | * | 4/1996 | Ullman et al. | 280/281.1 |
| 6,135,668 A | * | 10/2000 | Lin | 403/322.4 |
| 6,139,038 A | * | 10/2000 | Santa Cruz et al. | 280/278 |
| 6,206,387 B1 | * | 3/2001 | Tsai | 280/87.041 |
| 6,332,621 B1 | * | 12/2001 | Wu | 280/87.041 |
| 6,378,880 B1 | * | 4/2002 | Lin | 280/87.05 |
| 6,431,567 B2 | * | 8/2002 | Tsai | 280/87.041 |
| 6,830,255 B2 | * | 12/2004 | Cheng | 280/87.041 |
| 6,845,997 B2 | * | 1/2005 | Chou | 280/278 |
| 6,966,572 B2 | * | 11/2005 | Michelau et al. | 280/287 |
| 6,984,194 B2 | * | 1/2006 | Ma | 482/57 |
| 7,011,319 B2 | * | 3/2006 | Lu | 280/87.041 |
| 7,156,405 B1 | * | 1/2007 | Ming | 280/87.05 |
| 2001/0030405 A1 | * | 10/2001 | Wu et al. | 280/87.041 |
| 2005/0035570 A1 | * | 2/2005 | Chu | 280/278 |

* cited by examiner

*Primary Examiner*—Lesley D Morris
*Assistant Examiner*—Marc A Scharich
(74) *Attorney, Agent, or Firm*—McNees Wallace & Nurick, LLC

(57) ABSTRACT

A vehicle frame assembly includes a forked first frame member coupled to a second frame member via a coupling device. The coupling device includes first and second tab units, and a fastening unit. The first tab unit is mounted on the first frame member, and includes a pair of first tabs, each formed with a first coupling hole and an angle-adjusting hole unit. The second tab unit is mounted on the second frame member, and includes a pair of second tabs, each formed with a second coupling hole and an engaging hole unit to be registered with the first coupling holes and the angle-adjusting hole units, respectively. The fastening unit includes a first fastener extended removably through the first and second coupling holes, and a second fastener extended removably through the angle-adjusting hole units and the engaging hole units.

6 Claims, 7 Drawing Sheets

VEHICLE FRAME ASSEMBLY WITH COUPLING DEVICE FOR COUPLING TWO FRAME MEMBERS

BACKGROUND OF THE INVENTION

1. Field of the Invention

The invention relates to a vehicle frame assembly, more particularly to a vehicle frame assembly having a coupling device for coupling two frame members.

2. Description of the Related Art

FIG. 1 illustrates a conventional vehicle frame assembly for a bicycle or tricycle. The vehicle frame assembly includes a forked first frame member 11 and a second frame member 12, such as a crossbar or down tube. The first frame member 11 includes an upper head tube segment 111 and a lower front fork segment 112 connected to the head tube segment 111. Since the second frame member 12 is welded to or is formed integrally with the head tube segment 111, the following drawbacks are encountered in the conventional vehicle frame assembly:

1. Since the frame members 11, 12 cannot be disassembled from each other, the storage space requirement is large, and transport costs are relatively high.
2. The angle formed between the frame members 11, 12 is fixed and cannot be adjusted to suit the needs of a specific user, which can lead to discomfort when riding.

SUMMARY OF THE INVENTION

Therefore, the object of the present invention is to provide a vehicle frame assembly that can overcome at least one of the aforesaid drawbacks associated with the prior art.

Accordingly, a vehicle frame assembly of this invention comprises a forked first frame member, a second frame member, and a coupling device for coupling the first frame member to the second frame member. The coupling device includes a first tab unit, a second tab unit, and a fastening unit. The first tab unit is mounted on the first frame member, and includes a parallel pair of spaced apart first tabs, each of which is formed with a first coupling hole and an angle-adjusting hole unit. The second tab unit is mounted on the second frame member, and includes a parallel pair of spaced apart second tabs, each of which is formed with a second coupling hole and an engaging hole unit. One of the first and second tab units is extended between the other of the first and second tab units to register the first coupling holes with the second coupling holes and to register the angle-adjusting hole units with the engaging hole units. The fastening unit fastens the second tab unit to the first tab unit, and includes a first fastener extended removably through the first and second coupling holes in the first and second tabs, and a second fastener extended removably through the angle-adjusting hole units and the engaging hole units in the first and second tabs.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
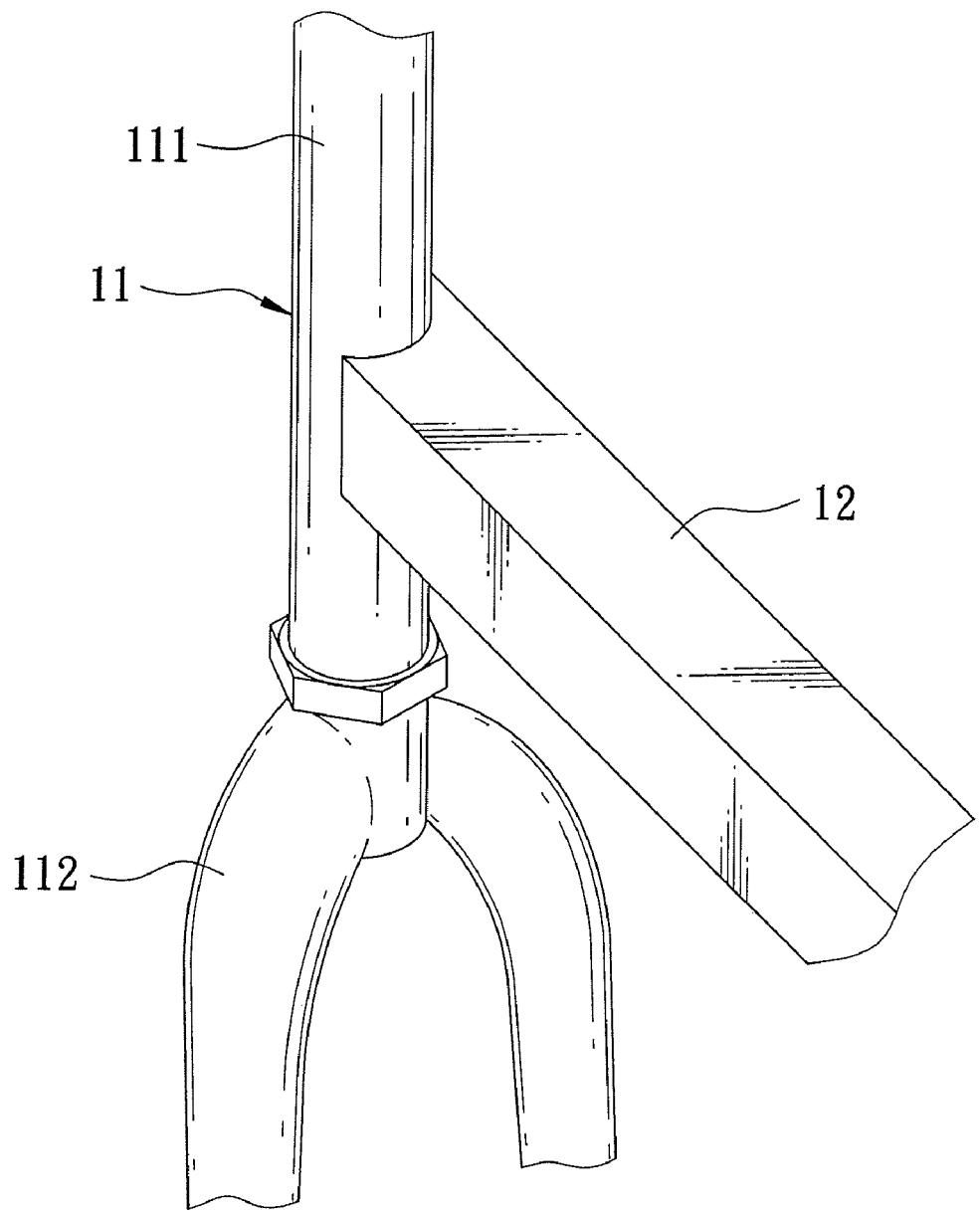
FIG. 1 is a fragmentary perspective view of a conventional vehicle frame assembly.
Figure 2:
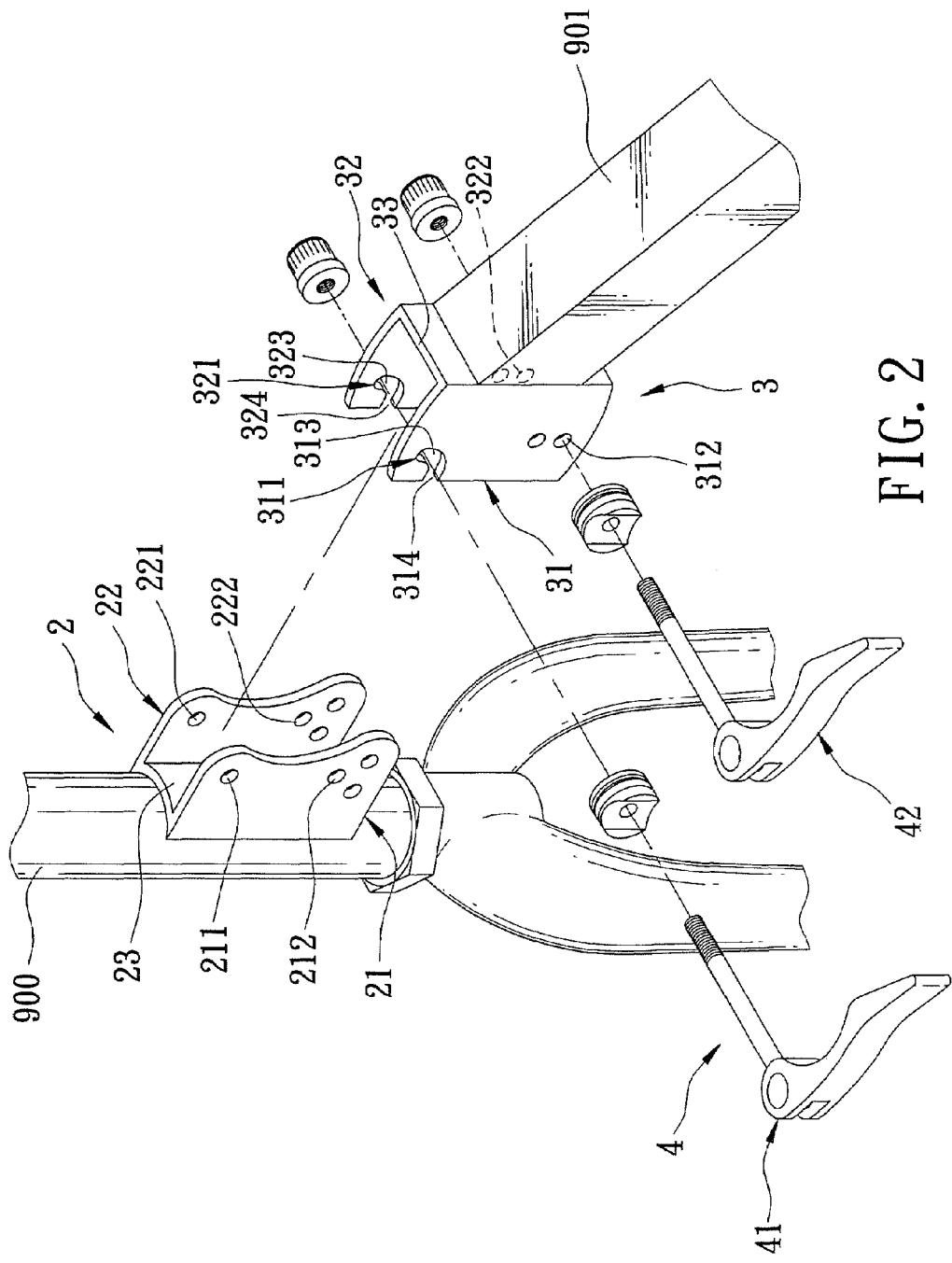
FIG. 2 is a fragmentary exploded perspective view of the preferred embodiment of a vehicle frame assembly according to this invention.
Figure 3:
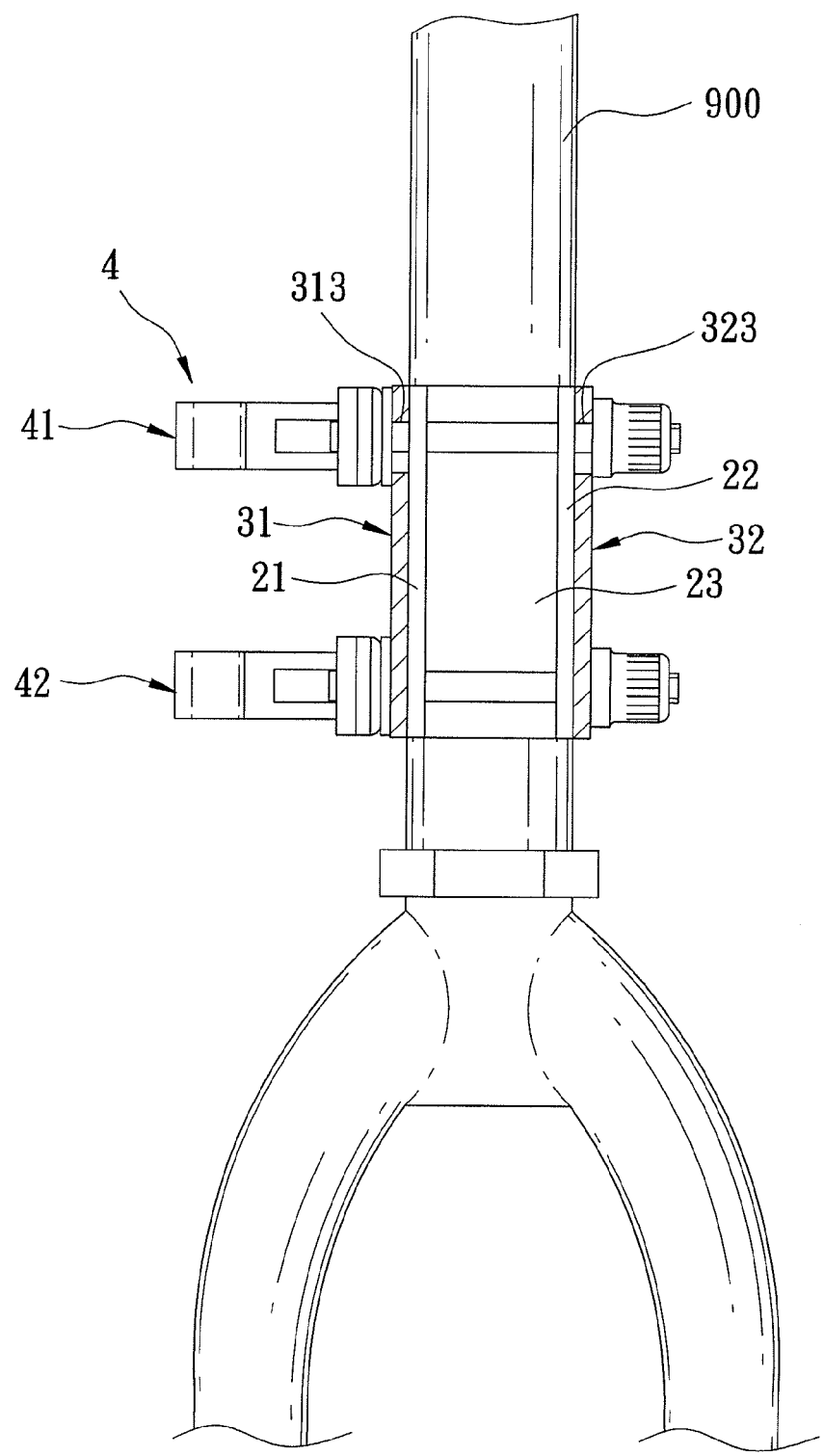
FIG. 3 is a fragmentary, partly sectional, schematic front view of the preferred embodiment in an assembled state.
Figure 4:
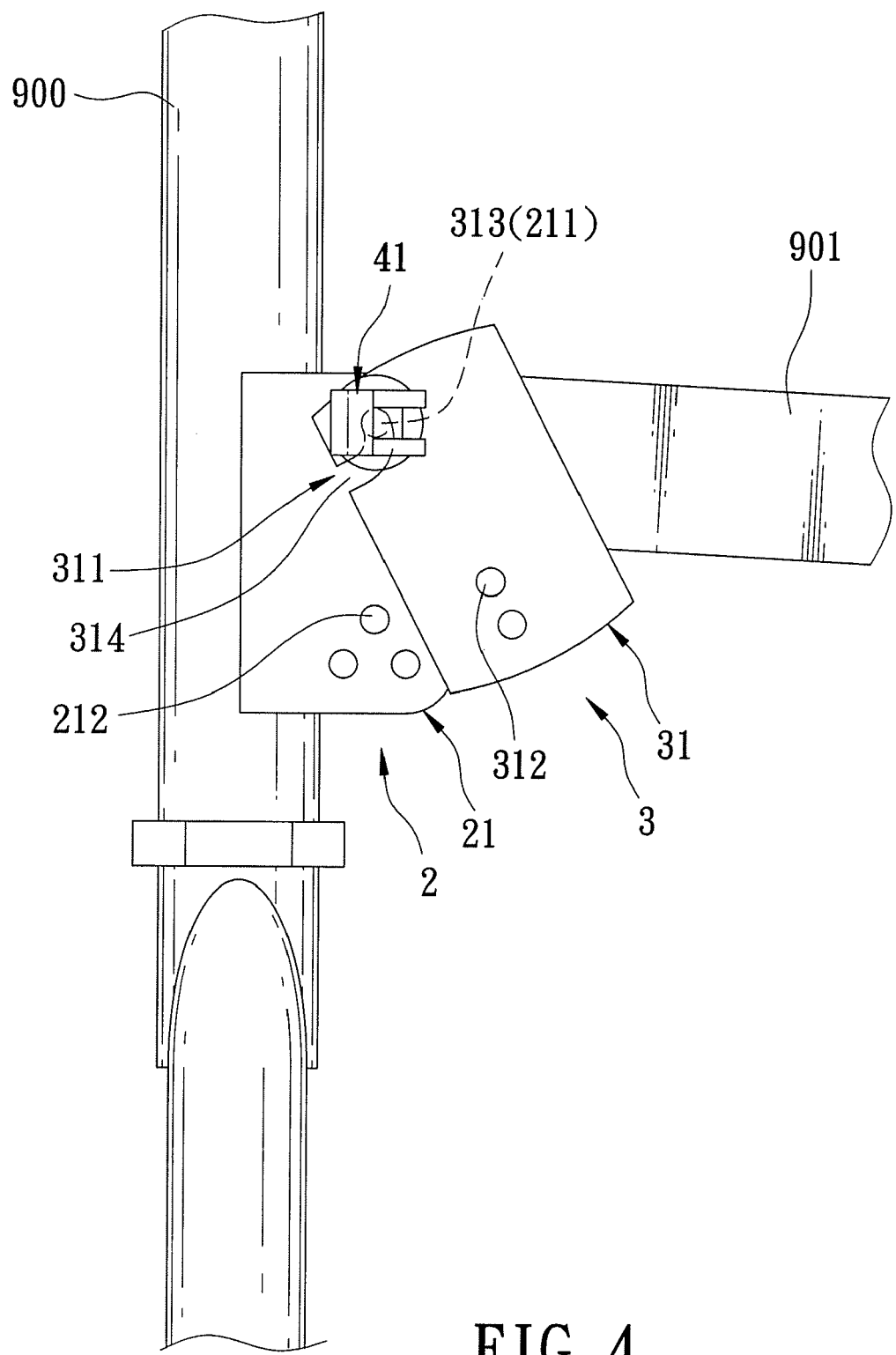
FIG. 4 is a fragmentary schematic side view of the preferred embodiment to illustrate how first and second tab units of a coupling device are fastened together via a first fastener of a fastening unit.

Referring to FIGS. 2, 3 and 4, the preferred embodiment of a vehicle frame assembly according to the present invention is shown to include a forked first frame member 900, a second frame member 901, and a coupling device for coupling the first frame member 900 to the second frame member 901. The vehicle frame assembly is suitable for application to a bicycle or tricycle. In this embodiment, the first frame member 900 is a forked head tube, and the second frame member 901 may be a crossbar or down tube. The coupling device includes a first tab unit 2, a second tab unit 3, and a fastening unit 4.

The first tab unit 2 includes a parallel pair of spaced apart first tabs 21, 22, and a first connecting piece 23 that is mounted fixedly on the first frame member 900 and that interconnects the first tabs 21, 22. Each of the first tabs 21, 22 is formed with a first coupling hole 211, 221, and an angle-adjusting hole unit 212, 222. In this embodiment, each of the angle-adjusting hole units 212, 222 includes three angle-adjusting holes, which are non-collinear and which are disposed at vertices of a triangle, respectively.

The second tab unit 3 includes a parallel pair of spaced apart second tabs 31, 32, and a second connecting piece 33 that is mounted fixedly on the second frame member 901 and that interconnects the second tabs 31, 32. Each of the second tabs 31, 32 is formed with a second coupling hole 311, 321, and an engaging hole unit 312, 322. In this embodiment, the first tab unit 2 is extended between the second tab unit 3 to register the first coupling holes 211, 221 with the second coupling holes 311, 321 and to register the angle-adjusting hole units 212, 222 with the engaging hole units 312, 322. Preferably, each of the second tabs 31, 32 has a front edge, and each of the second coupling holes 311, 321 includes an extension portion 314, 324 that extends rearwardly from the front edge of the respective one of the second tabs 31, 32, and an engaging portion 313, 323 that extends rearwardly and upwardly from the extension portion 314, 324. In this embodiment, each of the engaging hole units 312, 322 includes two engaging holes.

The fastening unit 4 fastens the second tab unit 3 to the first tab unit 2, and includes a first fastener 41 extended removably through the first and second coupling holes 211, 221, 311, 321 in the first and second tabs 21, 22, 31, 32, and a second fastener 42 extended removably through a selected one of the angle-adjusting holes in each of the first tabs 21, 22 and a selected one of the engaging holes in each of the second tabs 31, 32. In this embodiment, each of the first and second fasteners 41, 42 is a known quick-release fastener. In practice, the first and second fasteners 41, 42 may be implemented using removable pins to achieve the same effect.

Figure 5:
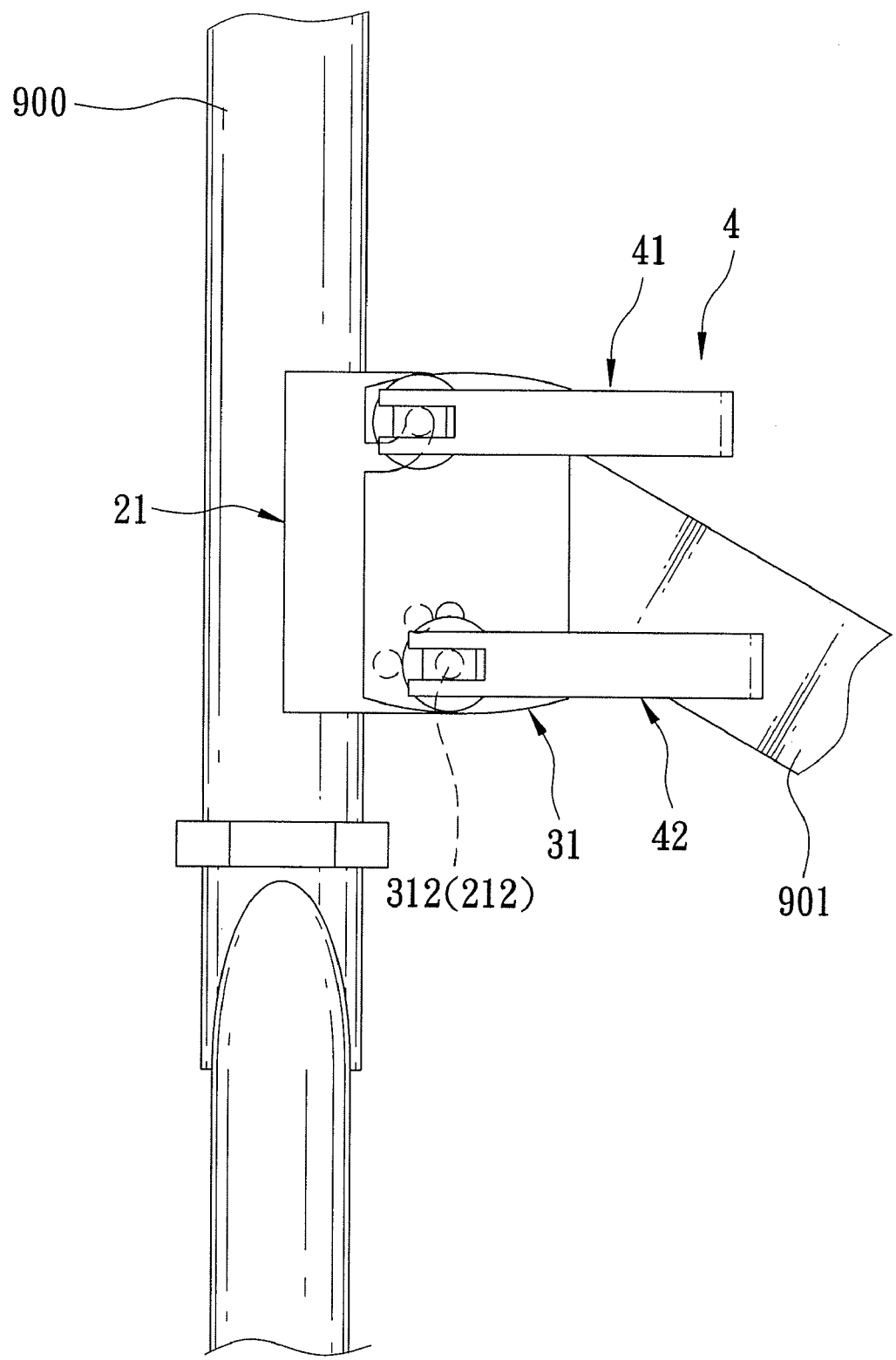
FIGS. 5 to 7 are views similar to FIG. 4, but illustrating how first and second fasteners of the fastening unit cooperate with the first and second tab units such that an angle formed between first and second frame members coupled together by the coupling device can be varied to suit the needs of a specific user.
Figure 6:
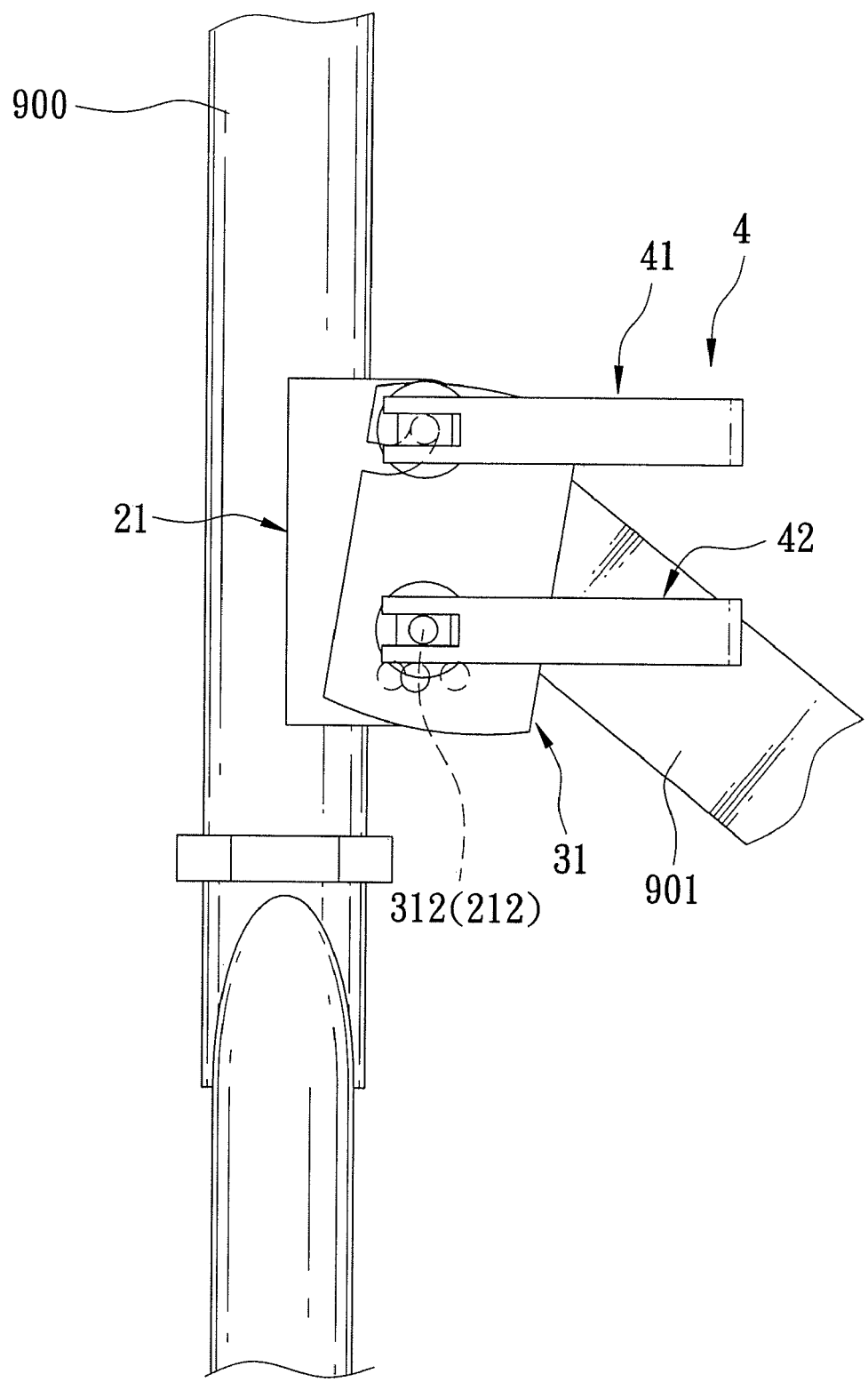
Figure 7:
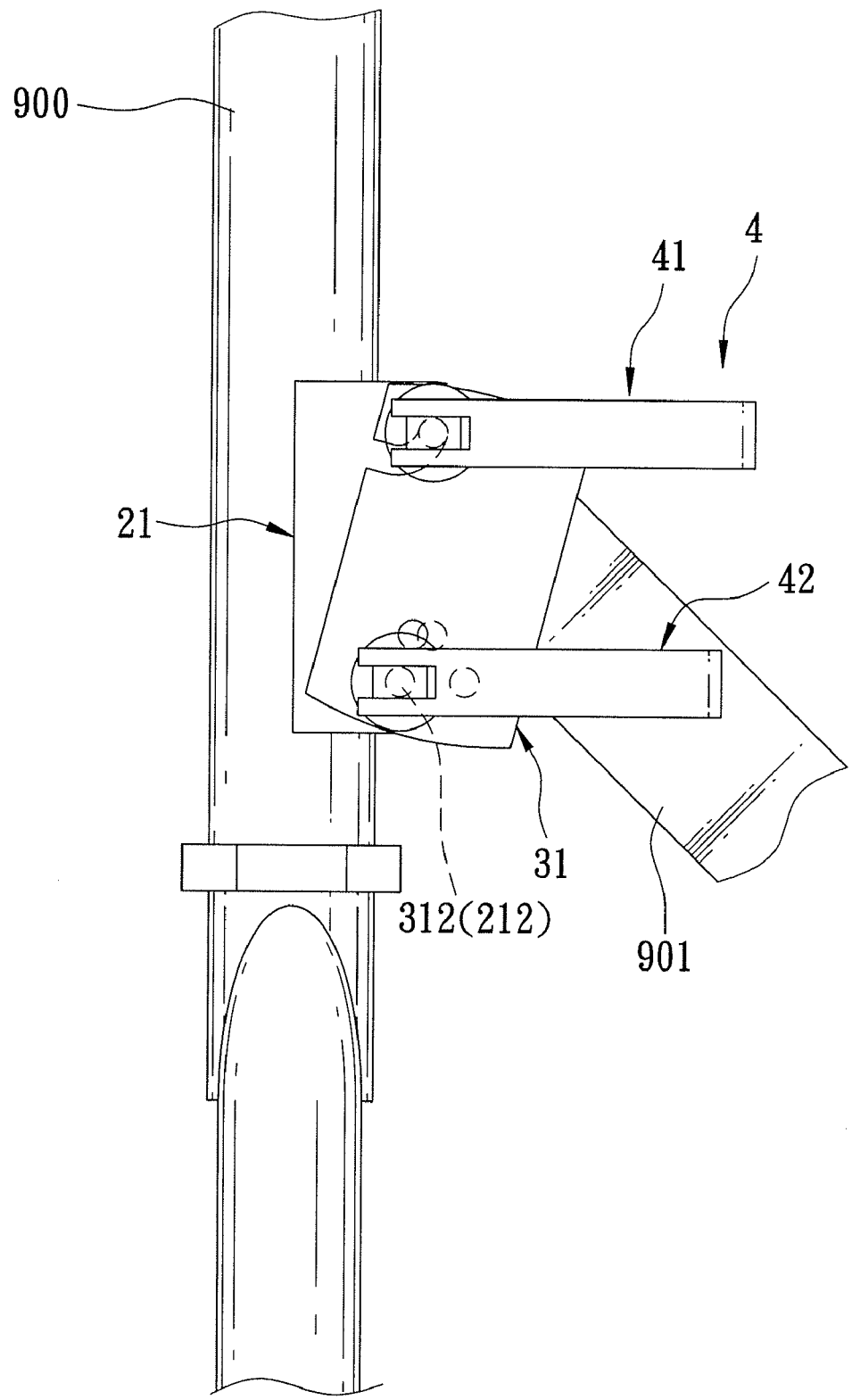

In sum, since the fasteners 41, 42 permit the frame members 900, 901 to be disassembled from each other, the storage space requirement is reduced, and transport costs are reduced as well. Moreover, with reference to FIGS. 5 to 7, by selecting which one of the angle-adjusting holes in each of the first tabs 21, 22 and which one of the engaging holes in each of the second tabs 31, 32 should the second fastener 42 extend, the angle formed between the first and second frame members 900, 901 may be varied to suit the needs of a specific user. In particular, the arrangement of FIG. 5 is suitable for a rider with shorter arms, the arrangement of FIG. 6 is suitable for an ordinary rider, and the arrangement of FIG. 7 is suitable for a rider with longer arms.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A vehicle frame assembly comprising a forked first frame member, a second frame member, and a coupling device for coupling said first frame member to said second frame member, said coupling device including
    a first tab unit mounted on said first frame member and including a parallel pair of spaced apart first tabs, each of which is formed with a first coupling hole and an angle-adjusting hole unit,
    a second tab unit mounted on said second frame member and including a parallel pair of spaced apart second tabs, each of which is formed with a second coupling hole and an engaging hole unit, one of said first and second tab units being extended between the other of said first and second tab units to register said first coupling holes with said second coupling holes and to register said angle-adjusting hole units with said engaging hole units, and
    a fastening unit for fastening said second tab unit to said first tab unit, said fastening unit including a first fastener extended removably through said first and second coupling holes in said first and second tabs, and a second fastener extended removably through said angle-adjusting hole units and said engaging hole units in said first and second tabs;
    wherein each of said angle-adjusting hole units includes three angle-adjusting holes, each of said engaging hole units includes two engaging holes, and said second fastener is extended removably through a selected one of said angle-adjusting holes in each of said first tabs and a selected one of said engaging holes in each of said second tabs.

2. The vehicle frame assembly as claimed in claim 1, wherein said first tab unit further includes a first connecting piece that is mounted on said first frame member and that interconnects said first tabs.

3. The vehicle frame assembly as claimed in claim 2, wherein said second tab unit further includes a second connecting piece that is mounted on said second frame member and that interconnects said second tabs.

4. The vehicle frame assembly as claimed in claim 1, wherein at least one of said first and second fasteners is a quick-release fastener.

5. The vehicle frame assembly as claimed in claim 1, wherein each of said second tabs has a front edge, and each of said second coupling holes includes an extension portion that extends rearwardly from said front edge of the respective one of said second tabs, and an engaging portion that extends rearwardly and upwardly from said extension portion.

6. The vehicle frame assembly as claimed in claim 1, wherein said angle-adjusting holes in each of said first tabs are non-collinear and are disposed at vertices of a triangle, respectively.

* * * * *